March 17, 1931.  J. R. DEW ET AL  1,797,077
FLOWER STAND
Filed Jan. 6, 1930
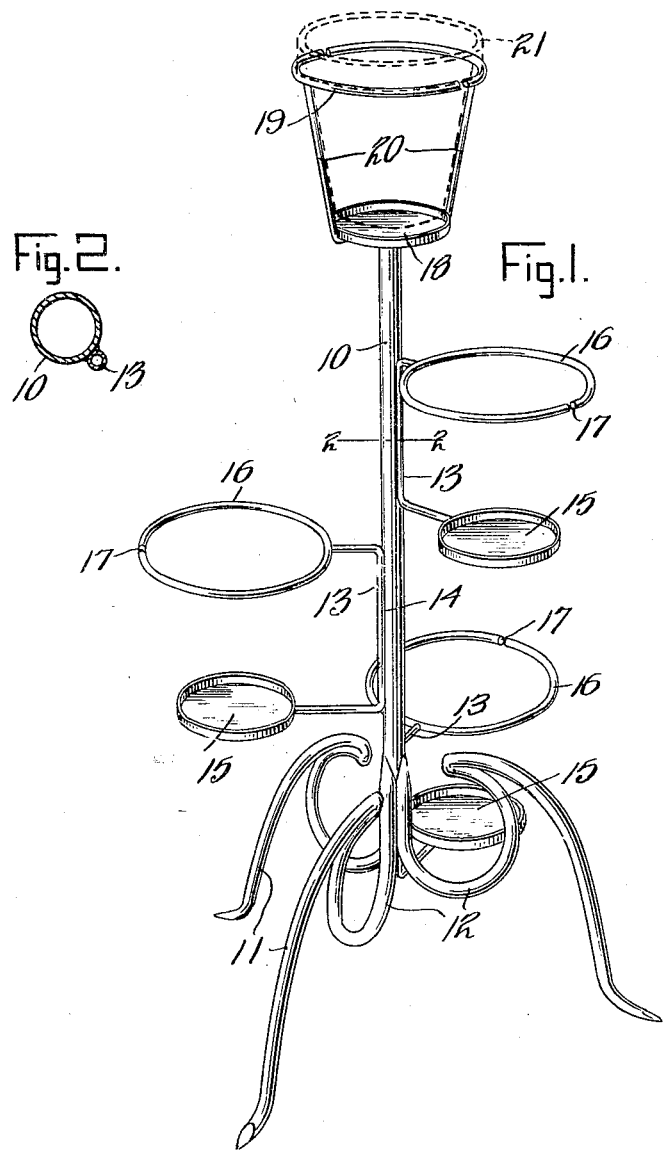
Inventors
John R. Dew
Roy Guffey Patented Mar. 17, 1931

1,797,077

UNITED STATES PATENT OFFICE

JOHN ROY DEW, OF SOUTH JACKSONVILLE, FLORIDA, AND ROY GUFFEY, OF SOMERSET, KENTUCKY

FLOWER STAND

Application filed January 6, 1930. Serial No. 418,969.

This invention relates to flower stands and an object of the invention is to provide a novel attractive and substantial flower stand which will be very light in weight.

Referring to the accompanying drawings, which are made a part hereof and on which similar reference characters indicate similar parts, Figure 1 is view in elevation of the stand, and Figure 2, a section on line 2—2 of Figure 1.

This stand is preferably made of small metal rods or wire so bent and arranged and secured together as to make a well balanced stand.

In constructing the stand we preferably make a post 10 of tubular material or wire and weld legs 11 to the lower end. In order to provide an attractive stand we preferably provide a loop 12 in the end of the legs near where they are welded to the lower end of the supporting post 10. Secured to the side of the post 10 are a number of brackets 13 which are made preferably from tubular material, such as small pipe bent in the form of a U with one leg longer than the other and welded at 14 to the side of the post 10. To the end of the lower longer leg of the U is secured a cup 15, as by welding, and a tubular wire or split ring 16 is welded to the end of the upper short leg of the U. By having the ring 16 split, as shown at 17, this ring may be made to frictionally engage around a flower pot to hold this in position. A cup 18 similar to the cup 15 may be mounted on the upper end of the post 10. Semi-circular tubular wires 19 supported on the ends of the posts 20 serve to support a flower pot 21 on the top of the stand. By making the stand of tubular material we provide a very light but substantial stand.

It will be obvious to those skilled in the art that various changes may be made without departing from the spirit of the invention and therefore we do not limit ourselves to what is shown in the drawings and described in the specification but only as indicated in the appended claims.

Having thus fully described our said invention, what we claim as new and desire to secure by Letters Patent, is:

1. A flower stand comprising a supporting shaft having a plurality of legs welded to the lower end, said legs each having a loop adjacent their upper end, and a U-shaped bracket welded to the side of the supporting shaft, one end of the U supporting a cup for receiving the flower pot and the other end of the U having a wire bracket secured thereto for holding a flower pot in the cup, substantially as set forth.

2. A flower stand comprising a shaft having legs secured on its lower end, a cup secured on its upper end, a pair of supporting bars secured to the said cup, each bar having a semi-circular bar secured on its upper end, said bar serving to support a flower pot in the said cup, substantially as set forth.

3. In a flower stand having an upright shaft and legs secured thereon, a supporting bracket secured upon the shaft comprising a rod welded to the side of the shaft and having its ends bent at right angles to the shaft, a cup secured on the lower bent end, and a split ring secured on the upper bent end, substantially as set forth.

In witness whereof, we have hereunto set our hands at Jacksonville, Florida, this 4th day of January, A. D. nineteen hundred and thirty.

ROY GUFFEY.
JOHN ROY DEW.